(12) United States Patent
Lepola et al.

(10) Patent No.: US 7,789,643 B2
(45) Date of Patent: Sep. 7, 2010

(54) IN SITU PIPE REPAIR CONTROLLER AND SYSTEM

(75) Inventors: William Lepola, Magnolia, TX (US); Kenton L. Knoppel, Houston, TX (US)

(73) Assignee: EMS Global Inc., Houston, TX (US)

( * ) Notice: Subject to any disclaimer, the term of this patent is extended or adjusted under 35 U.S.C. 154(b) by 1251 days.

(21) Appl. No.: 11/328,618

(22) Filed: Jan. 10, 2006

(65) Prior Publication Data

US 2006/0151037 A1    Jul. 13, 2006

Related U.S. Application Data

(60) Provisional application No. 60/642,566, filed on Jan. 10, 2005.

(51) Int. Cl.
  *B29C 73/00* (2006.01)
  *B32B 43/00* (2006.01)
(52) U.S. Cl. ............ 425/35; 138/97; 405/146; 405/150.1; 425/135; 425/387.1
(58) Field of Classification Search ............ 138/97, 138/98; 156/254, 287, 423; 405/146, 150.1; 425/11, 59, 387.1, 503; 118/254
See application file for complete search history.

(56) References Cited

U.S. PATENT DOCUMENTS

| | | | | |
|---|---|---|---|---|
| 4,350,548 | A * | 9/1982 | Zenbayashi et al. | 156/156 |
| 4,789,267 | A * | 12/1988 | Babendererde et al. | 405/146 |
| 5,265,648 | A * | 11/1993 | Lyon | 138/98 |
| 5,500,510 | A * | 3/1996 | Kumagai | 219/505 |
| 6,665,492 | B1 * | 12/2003 | Garcia et al. | 392/383 |
| 6,899,491 | B2 * | 5/2005 | Bateman | 405/184.2 |
| 2003/0213556 | A1 | 11/2003 | Blackmore et al. | |
| 2004/0016467 | A1 | 1/2004 | Blackmore et al. | |

(Continued)

OTHER PUBLICATIONS

Novatech Systems, Hot Bonding Controller, info@novatech.com.au (4 pgs.).

(Continued)

*Primary Examiner*—Yogendra N Gupta
*Assistant Examiner*—Emmanuel S Luk
(74) *Attorney, Agent, or Firm*—David McEwing

(57) ABSTRACT

A control apparatus used in conjunction with tools and devices such as electrical power supplies, fluid pumps and vacuums for in situ repair of pipes. A method for controlling in situ repair of pipe using electrical power sources, fluid and pressure sources and flexible heat and inflation bladder installing thermal responsive repair materials and applying the repair material to the interior wall surface. The apparatus controls the inflation of the repair tool inserted into a pipe and the amount and rate of fluid pressure and maintenance of a selected pressure. The apparatus may also control the evacuation of the fluid from the bladder of the repair tool. The device controls the heating of the tool used in the installation of the repair material. The invention also teaches a method for controlled inflation and expansion of the bladder carrying the repair material to the area of the pipe to be repaired and heating the material at a rate and to a temperature to facilitate optimum curing or installation of the thermally responsive repair material. The invention also teaches the detachment of the repair material and removal of the repair tool. The method further includes the procedures necessary to complete the installation of these materials.

6 Claims, 18 Drawing Sheets

U.S. PATENT DOCUMENTS

2004/0136786 A1* 7/2004 Bateman ................... 405/184.1
2004/0177928 A1* 9/2004 Bivens ....................... 156/359
2006/0159791 A1* 7/2006 Kamiyama et al. ............ 425/11
2007/0240779 A1* 10/2007 Kamiyama et al. ............ 138/98

OTHER PUBLICATIONS

Briskheat, Advanced Composite Repair 2 Portable Hot Bonder, www.briskheat.com (2 pgs).

* cited by examiner

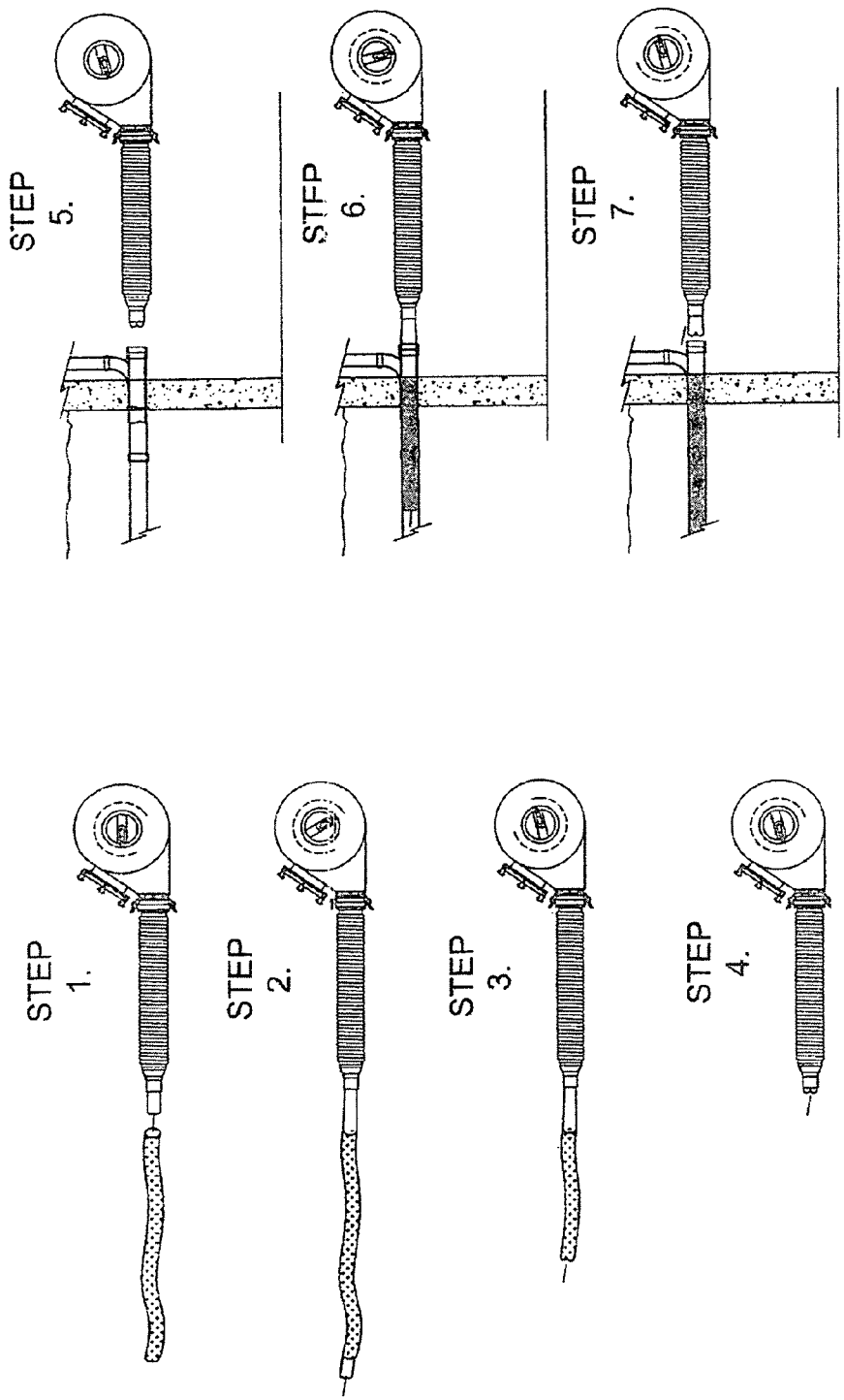

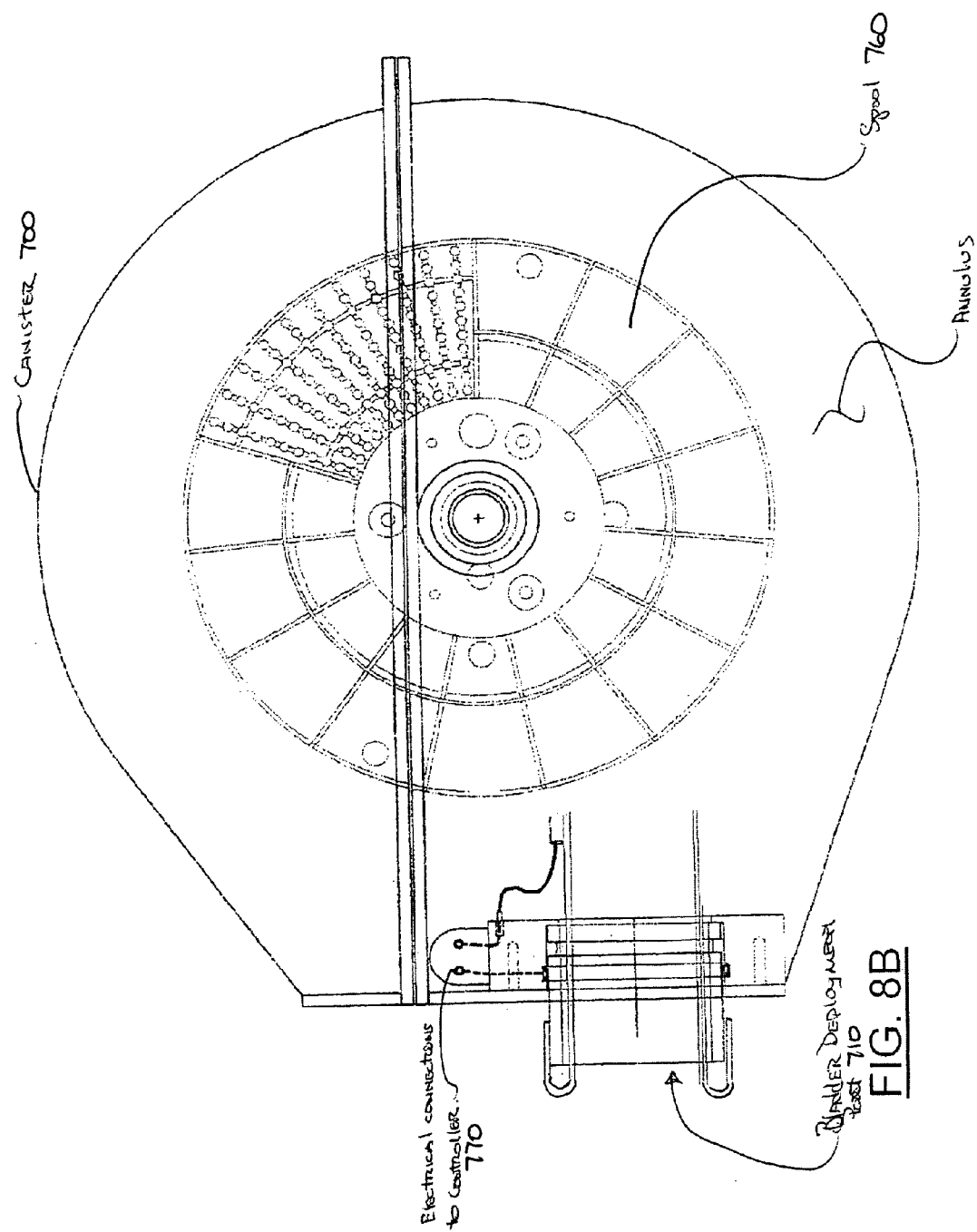

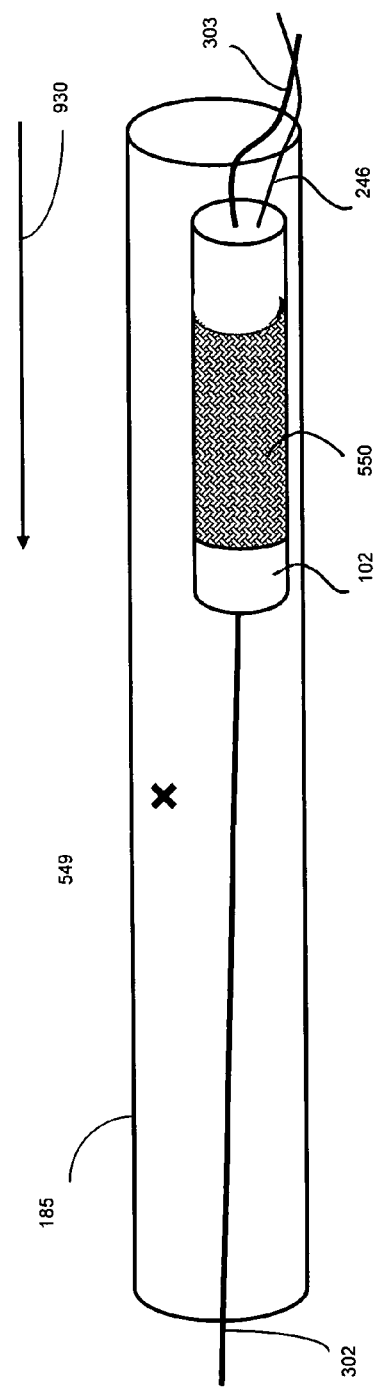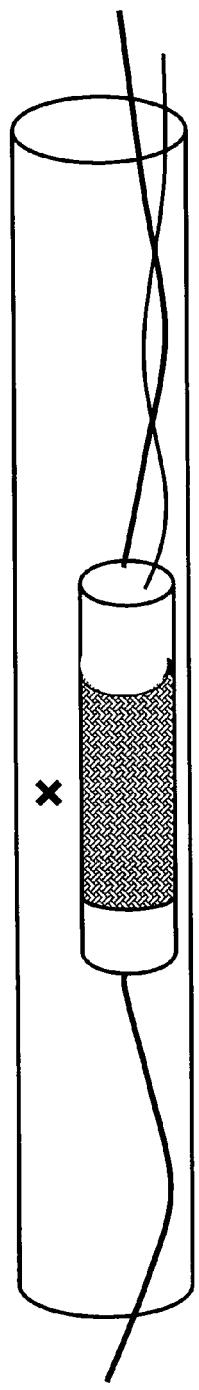
FIG. 10A
FIG. 10B

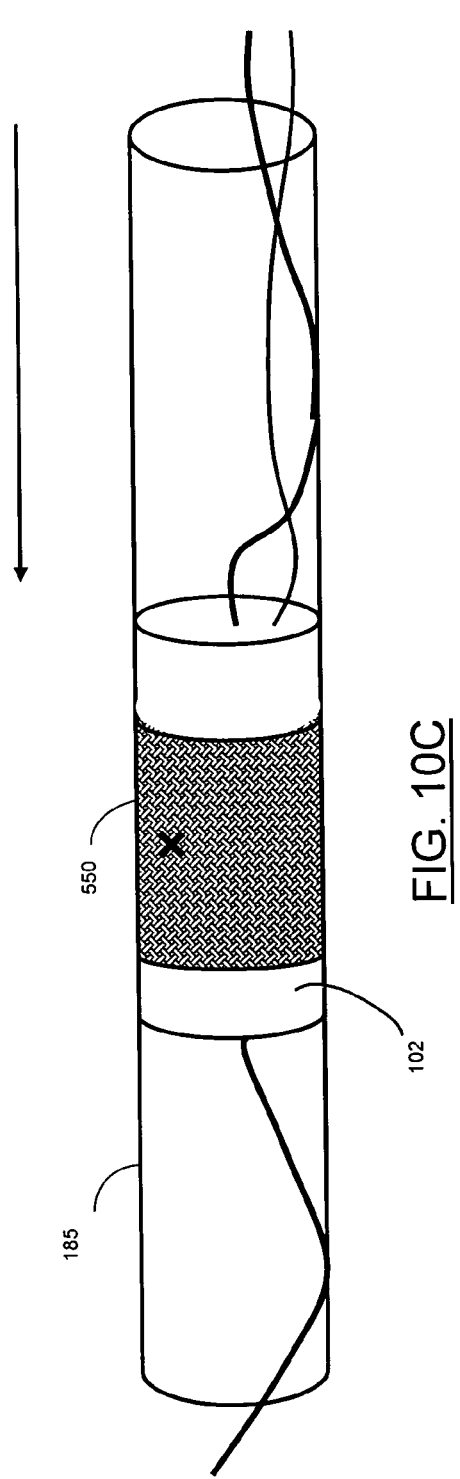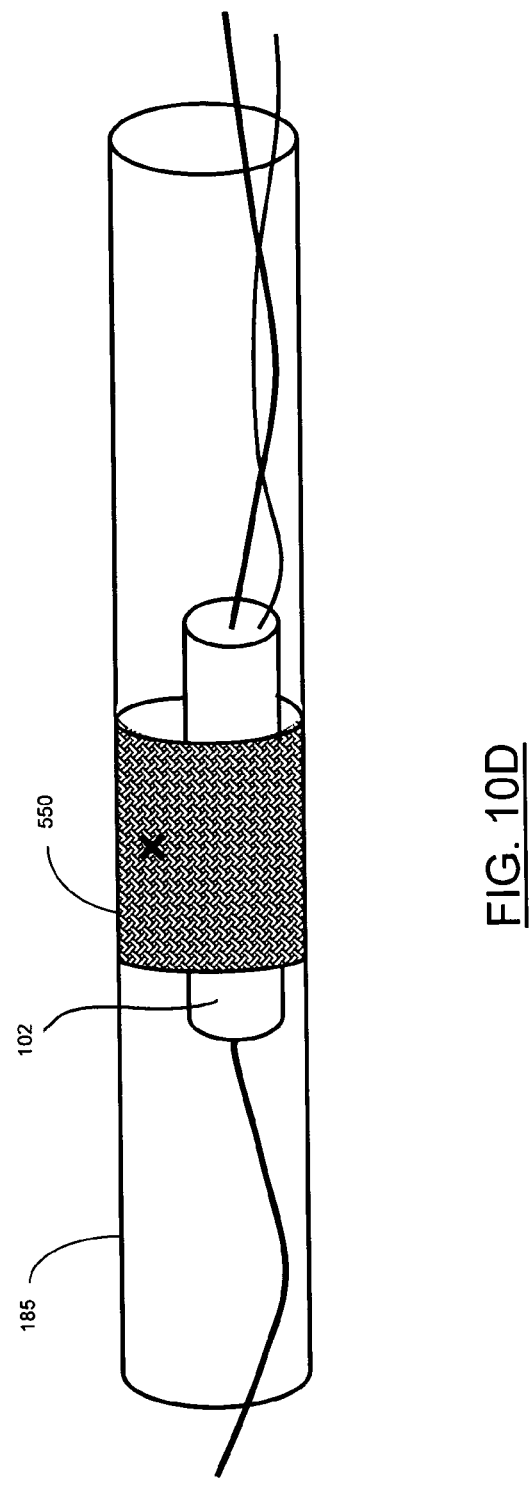

IN SITU PIPE REPAIR CONTROLLER AND SYSTEM

CROSS REFERENCE TO RELATED APPLICATION

This application claims the benefit of and priority to U.S. Provisional Application No. 60/642,566 entitled "V-Pac Controller" and filed Jan. 10, 2005.

BACKGROUND OF INVENTION

1. Field of Invention

The present invention generally relates to a control apparatus and method used in conjunction with pipe repair devices. More specifically, the invention pertains to a control apparatus and method permitting the installation of a repair material controlled from a remote location using fluid pressure and electrically resistive or impedance heating to deploy, form and cure the repair material to the inside surface of a pipe.

2. Description of Related Art

The invention pertains to the field of pipe or conduit repair. An example is installing a lining to the interior surface of a pipe. Heated water or steam is sometimes used as part of the lining installation process. Resistive heating may also be used.

BRIEF SUMMARY OF THE INVENTION

The invention pertains to an in situ pipe repair device controller that is attachable to a fluid source, an electrical power source and an in situ pipe repair device. The controller subject of the invention comprises a fluid controlling component and an electrical power controlling component wherein the controller controls fluid pressure and electrical power to an inflatable and resistively heatable bladder of the in situ pipe repair device.

The features and advantages of the present invention will be apparent from the following description taken in conjunction with the accompanying drawings, which illustrate, by way of example, the principles of the invention. The scope of the invention however, is not limited to this description. Other benefits of the invention will also become apparent to those skilled in the art and such advantages and benefits are included within the scope of this invention.

BRIEF SUMMARY OF DRAWINGS

FIG. 6 illustrates the steps of loading and installation of repair material using a bladder deployment canister device that can be used with and controlled by the subject invention.

FIG. 8B illustrates a cross sectional view of the canister and rotatable spool (shown in phantom) used to convey and deploy the bladder.

FIGS. 10A through 10E illustrate the steps of a repair process controlled by the device of the invention.

Figure 1:
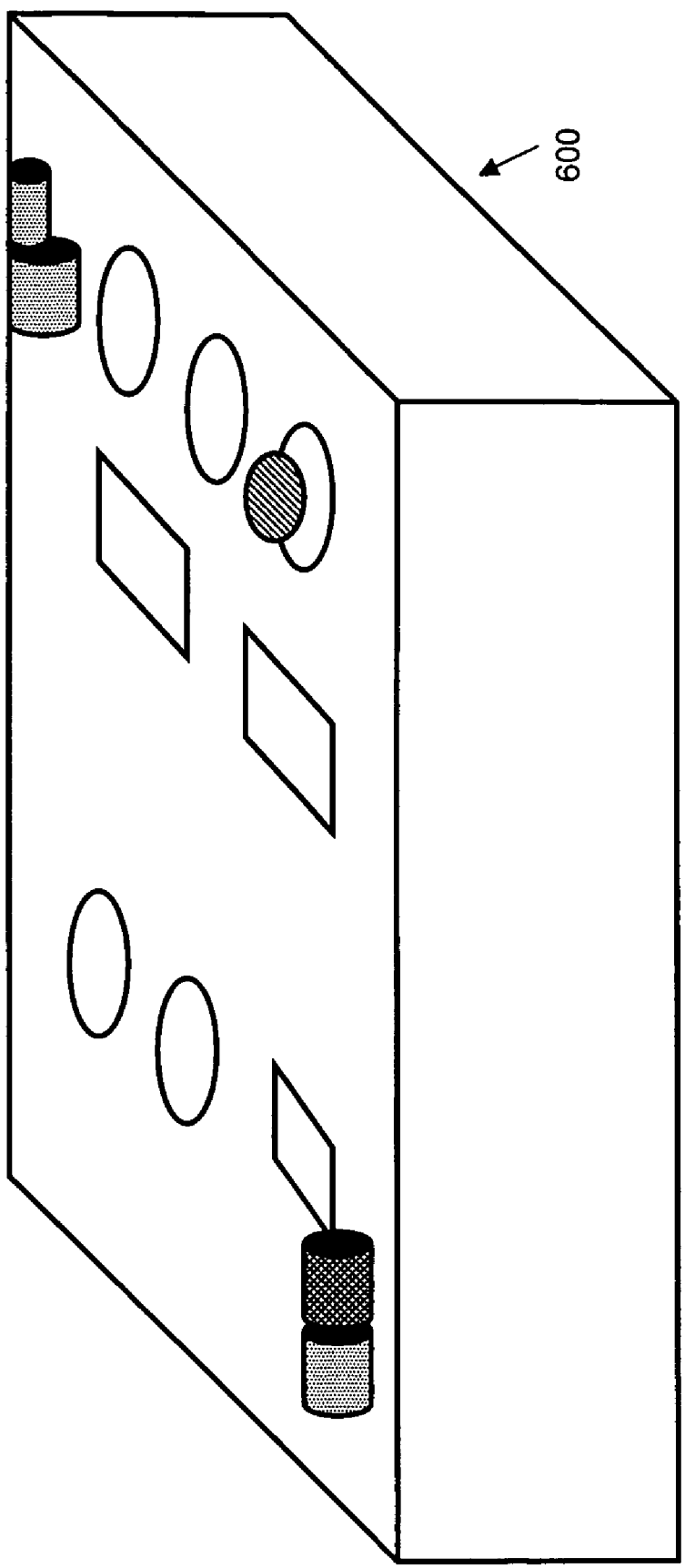
FIG. 1 illustrates a perspective view of the control apparatus of the invention.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF INVENTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. The above general description and the following detailed description are merely illustrative of the subject invention and additional modes, advantages and particulars of this invention will be readily suggested to those skilled in the art without departing from the spirit and scope of the invention.

The present invention generally relates to a control apparatus (hereinafter "controller") and method to be used in conjunction with pipe repair tools and devices and ancillary components such as electrical power supplies, fluid pumps, air compressors and vacuum pumps. The controller may be part of a system for in situ repair of a pipe or conduit (hereinafter "pipe") by using electrical power sources, fluid and pressure sources and one or more pipe repair devices having heatable and inflatable components. The pipe repair tools or devices (hereinafter "repair devices") may be used for installing thermal responsive repair materials to the interior pipe wall surface. The controller may control the movement of the repair device within the pipe. The controller may control the inflation of the repair device by controlling the amount and rate of fluid pressure and maintenance of a selected pressure within the inflatable component. The controller may also control the evacuation of the fluid from the inflatable component (hereinafter "bladder") of the repair tool. The controller can also control the heating of the repair device used in the installation of the repair material. The controller may also include the capability of controlling the deployment of a bladder and the ancillary components at the interface or junction of two pipes.

The invention also teaches a method for controlled inflation and expansion of the bladder (a repair device or component of a repair device) carrying the repair material to the area of the pipe to be repaired. The method also teaches heating the material at a rate and to a temperature to facilitate optimum curing or installation of the thermally responsive repair material. The invention also teaches the detachment of the repair material and removal of the repair device. The method further includes the procedures necessary to complete the installation of these materials.

The invention teaches a controller used in conjunction with various repair devices to accomplish in situ repair of pipes, including but not limited to underground pipes such as storm water and waste water pipes. The pipes can have a horizontal or vertical orientation. For example, the controller can be used in the lining of roof drain pipes. The invention can also be used in the repair of pipe used in chemical or other product manufacture or refining. The pipes can be of various materials, including but not limited to metal, plastic and concrete. The controller can contain or be used in conjunction with a CPU, data recorder, data or signal input output components and displays or printer. It may also be used with television cameras and monitors to facilitate the operator being able to visually monitor the deployment, placement and installation of the repair material into the pipe. The operator can also inspect the completion of repair prior to removal of all tooling, thereby avoiding the necessity of redeploying inspection devices.

It will be appreciated that in many instances, the location for the pipe repair is of very limited accessibility. The pipes may be of less than 6 inch diameter. The location for pipe repair can be in hazardous, unhealthy or harsh environments. It is often difficult to maneuver the repair material through the pipe to the necessary location. It is desired to have the repair device placed at an access port closest the repair location. This access location is also often harsh, dangerous or otherwise unsuitable for the device operator. It is therefore desirable that the operator of the repair devices be able to control the repair operations from a remote and less hazardous location. The can be accomplished by a single unit controlling multiple devices, components and operations.

FIG. 1 illustrates one embodiment of the in situ pipe repair controller. The controller 600 is, in one embodiment, contained in a portable case or container which can be attached to varying components such as an electrical power supply (a power source), air compressor (a fluid source), as well as the repair material installation device (repair device), such as a spot repair bladder, a lateral interface device or a bladder deployment canister (also known as a portable pipe repair system with electrically heated positioning member). The controller case is constructed of a lightweight but resilient resin plastic. The case and control panel may also include multiple "o-rings" or similar structures for moisture protection.

Figure 2:
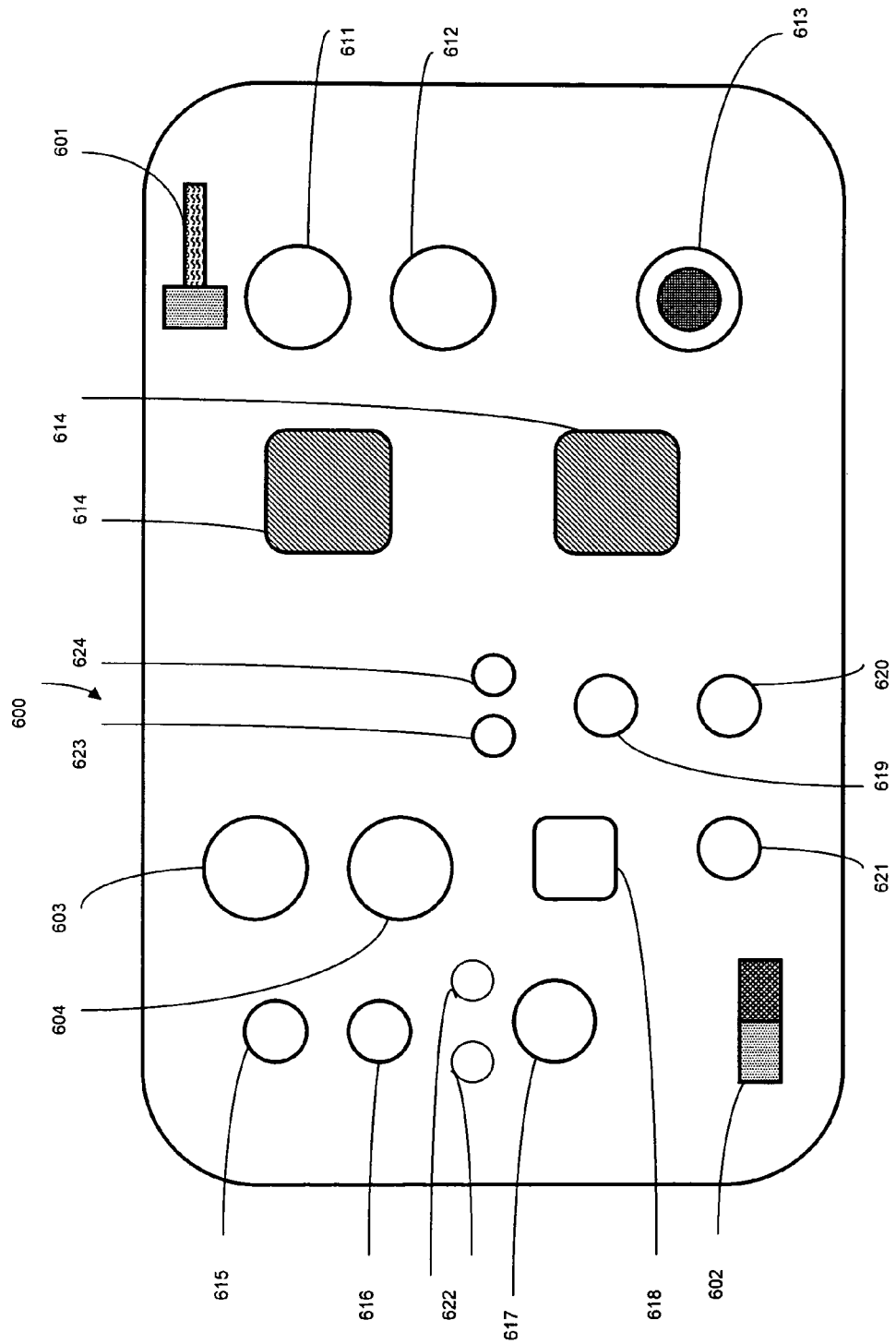
FIG. 2 illustrates a front view of the control apparatus showing individual controls comprising one embodiment of the invention.

With reference to FIG. 2, the controller subject of the invention may comprise fluid controlling components, illustrated as a male type air hose attachment fitting (fluid input) 601, and a counter part female air hose attachment outlet (fluid output) 602; a fluid pressure gauge 603 for measuring fluid, e.g., air in pounds per square inch or equivalent; a fluid pressure control 604 and pressure release valve 605. The fluid controlling components may be utilized in conjunction with an inflatable bladder or inflatable component of the in situ pipe repair device.

The controller may include electrical power controlling components for one or more electrically powered winders or winches that can be utilized in conjunction with tether components of the pipe repair device. The tether components, controllably powered by the controller, can be used to deploy or pull (by winding and unwinding) the repair device and as shown in FIGS. 10A through 10E.

The electrical power controls may also include components for controlling electrical current powering a resistive heating component within the pipe repair device. In one embodiment, the controller will include electrical control components that may comprise a 240 volt electrical input 611, a 480 volt electrical input 612, and an emergency power shut off switch 613. The controller may include one or more motorized cooling fans (not shown) and one or more vents 614, electrical power outlets 615, 616, circuit breakers 622, potentiometer 621, a timer 617 and electrical power meter 618 such as an amp meter. The controller also may also comprise a power on/off switch 619 and an electrical power controller 620. The controller may also contain power indicators (pilots) 623, 624 for each of the 240 volt and 480 volt circuits. The controller may contain a thyristor or silicon controlled rectifier (SCR). It may also include thermisters and temperature gauges responsive to one or more thermocouples. (It will be appreciated that the thermocouples can be located in the repair material being installed inside the pipe or located with the repair material installation device.) The controller may also contain one or more temperature gauges. It may also contain one or more circuit switches (not shown), permitting electrical power to be alternatively directed to different heating circuits (heating components) within a repair device or actual repair material. This may be particularly advantageous in the repair of large diameter pipes.

In one embodiment, the controller may be utilized in conjunction with a programmable CPU or processing unit. For example, the controls may respond to data inputs from a laptop computer and the computer may record the time and temperature profiles of the cure cycle. Accordingly, the controller may contain a suitable data input component such as a USB port or fire wire connection.

In another embodiment, the controller also incorporates several operator safety features. These features include use of 120 VAC and 240 VAC power supplies, in conjunction with contacts and relays, to reduce the voltage at the controls to 12 volts. The operator is also protected from the high voltage power supply by a ground fault circuit interrupter (not shown). An additional safety component is the prominent emergency off switch. The time or hour meter can be used for prompting routine maintenance. A timer may also be used for tracking a heating cycle.

Figure 3:
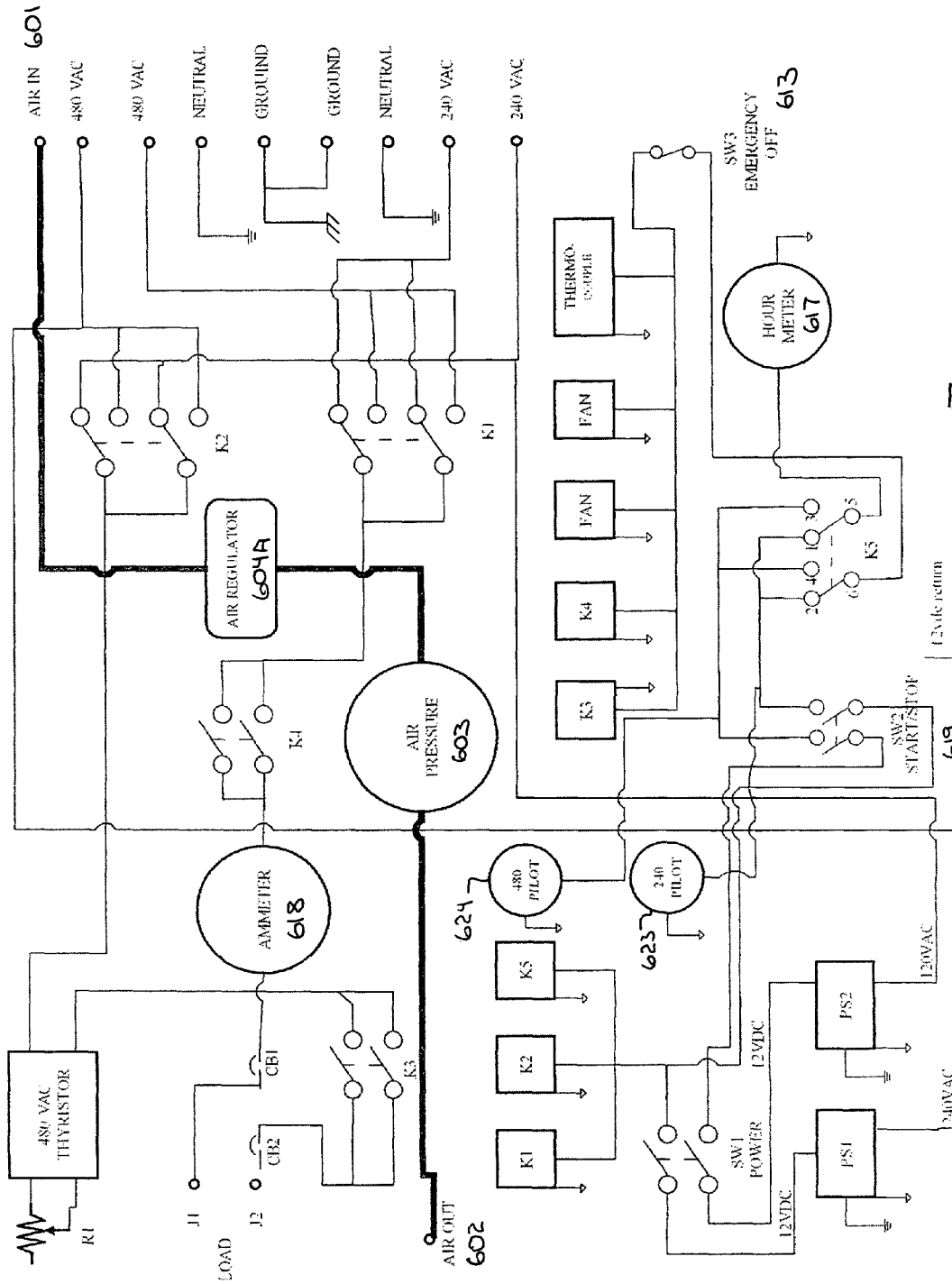
FIG. 3 is an electrical and fluid schematic depiction of the components of the embodiment of the control apparatus shown in FIG. 2.

FIG. 3 illustrates an electrical and fluid schematic diagram of one embodiment of the invention. Power regulation may be achieved by a solid state SCR, allowing infinitely variable range of voltage to be delivered to the repair device or repair material ("load"). Due to the heat generated by the SCR, the controller includes two fans ("intake" and "exhaust"). The control function can be implemented utilizing a potentiometer or the controller may be configured to accept signals from a CPU or process controller (not shown). The SCR can control an intra-cycle "off" period. During this very short interval, an impedance measurement of the heating circuit can be taken. This measurement can be correlated to temperature.

As indicated, one embodiment of the controller includes the ability to monitor or control the temperature during the repair process. Monitoring can, of course, be combined with varying the power level to accurately maintain a desired heat level at differing sections or locations in conjunction to the repair material and location within the pipe. The silicon controlled rectifier (SCR) controls current flow from an electrical power source to the resistive heating elements using switching techniques. When the control signal is off, the SCR performs as an open switch and prevents the current from flowing from the SCR to the resistive heating elements. At this time, the impedance of the heating elements can be measured to identify the level of heat production. When the control signal is on, the SCR acts as a unidirectional switch and current can flow to the resistive heating elements in one direction. SCR power controls use three different switching modes; on-off, phase angle and zero-fired. On-off controls replicate the operation of an electro-mechanical contactor or relay. Phase angle control replicates the operation of variable transformers, providing variable control of the voltage impressed on the load. Because SCRs can be switched on at any time during each half cycle of the AC wave-form, the voltage to the resistive heating elements is infinitely variable from zero to 100%. Phase angle switching will be suitable and desired for control of the heating process controlled by the invention.

The impedance measurement referred to above can be the means for in-process temperature monitoring. A measuring system will be employed to provide a feedback signal to the SCR power supply. The conductive fibers present in the resistive heating elements have a dual purpose. During the "on" cycle of the SCR, these fibers will provide the heat necessary for processing. During the "off" cycle of the SCR, these fibers will be utilized as sensing electrodes to provide information back to the impedance measuring system, and in turn, to the SCR.

A direct correlation exists between the conductivity of the heating elements and temperature that enables an accurate depiction of heat generation to be determined continuously throughout the repair process. In this technique, data from the monitoring will be used as input for statistical process control (SPC). Software can be developed to identify the time at which critical points related to a specific event occur. This in turn will provide feedback to a component that will send a proportional signal to the SCR.

Temperature control and monitoring can also be achieved by use of thermocouples in the repair device bladder or repair material. The schematic includes a thermocouple read out and thermocouple input. Of course, electrically conductive signal leads will be needed between the controller and the thermocouple.

Figure 4:
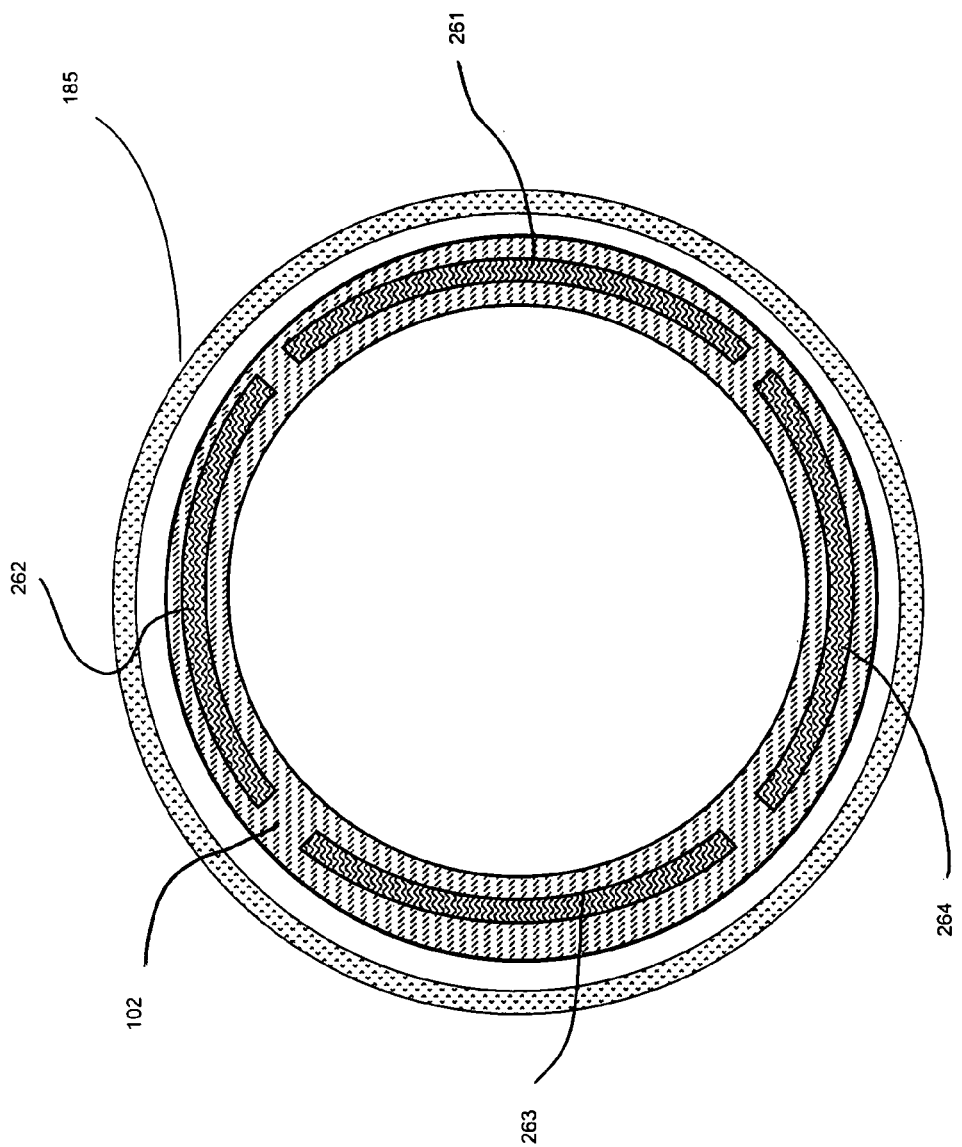
FIG. 4 is a cross sectional illustration of a repair device within the interior of a pipe and the device comprising multiple heating zones that can be controlled by the invention.

In the schematic illustrated in FIG. 3, the fluid pressure control 604A (shown to be pressurized air) is manually controlled. It will be appreciated that in other embodiments, the fluid pressure can be electronically controlled, including a control processor. This control can be integrated to the electrical heating cycle. In another embodiment, the controller of the invention can include a multiple pole switch to direct electric power to variable independent heating zones of a tool. A cross sectional view of such a bladder 102 having 4 heating zone components 261, 262, 263, 264 is illustrated in FIG. 4. A similar repair device is illustrated in FIG. 7A. Also illustrated in FIG. 4 is the relationship of the bladder to the interior of the pipe wall 185.

The schematic also illustrates the ability to control 480 volts of power. This may require use of a booster transformer pack, preferably in an outdoor "weather proof" casing. This booster pack 650, depicted in FIG. 7, doubles the voltage with a resulting decrease in amperage.

Figure 5:
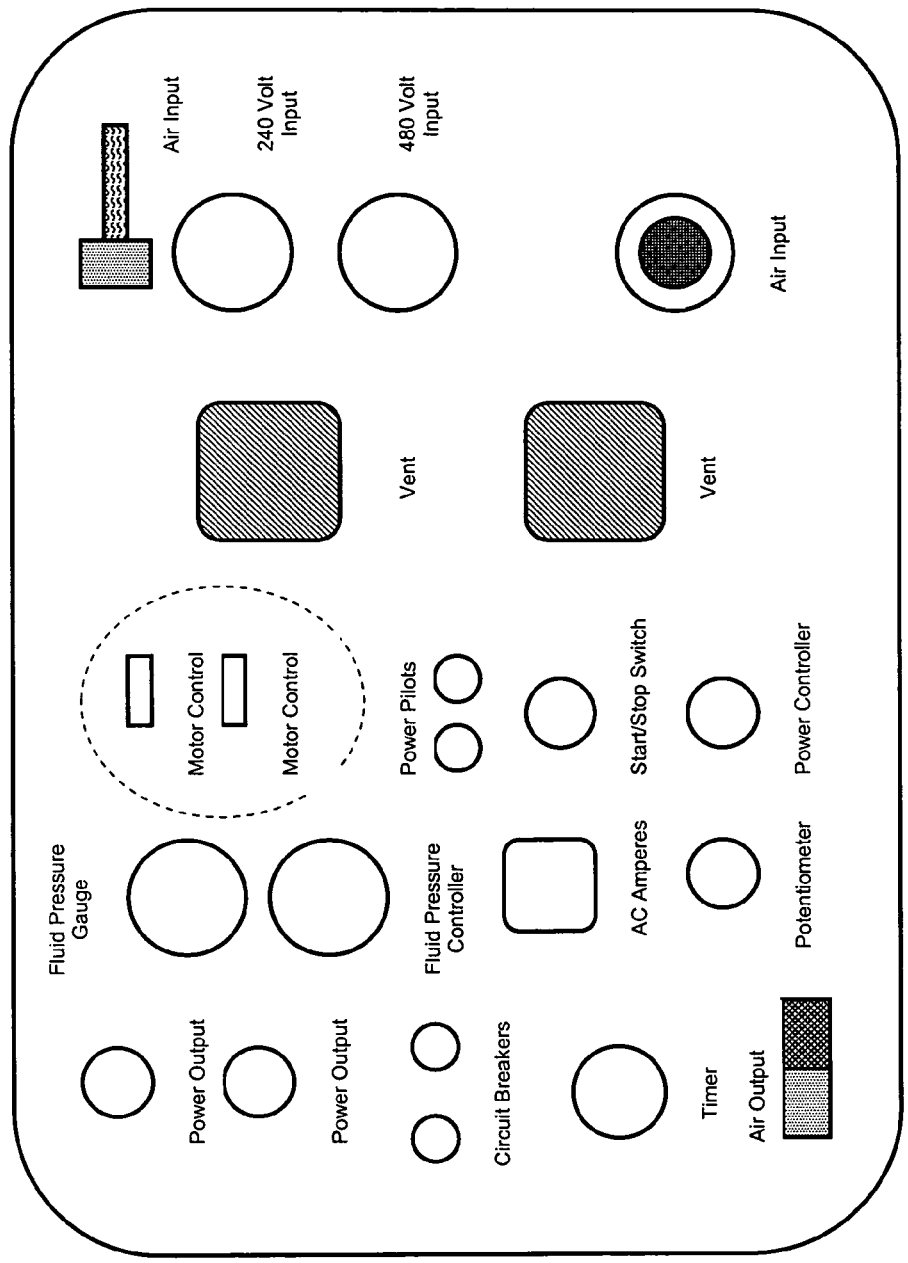
FIG. 5 illustrates another embodiment of the control panel subject of the invention.
Figure 5A:
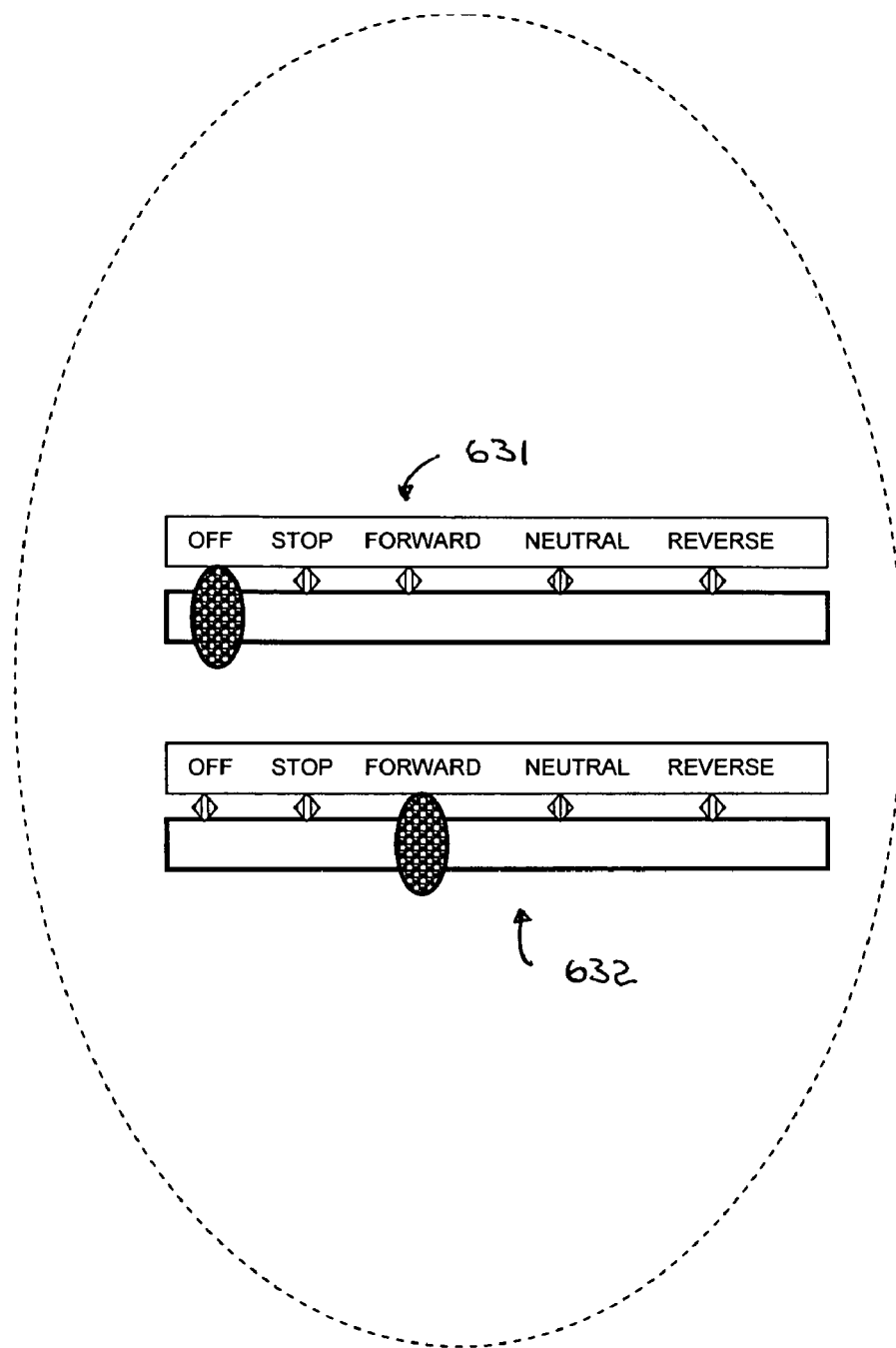
FIG. 5A illustrates a detail of the control panel showing controls for electrically powered winding mechanisms that may be used to pull a repair device through a pipe.

FIGS. 5 and 5A illustrate another embodiment of the invention that can include motor controls 631, 632 for a spool or winches (winding mechanisms) attached to tether components used in the deployment or retraction of repair devices from the pipe system.

Figure 7:
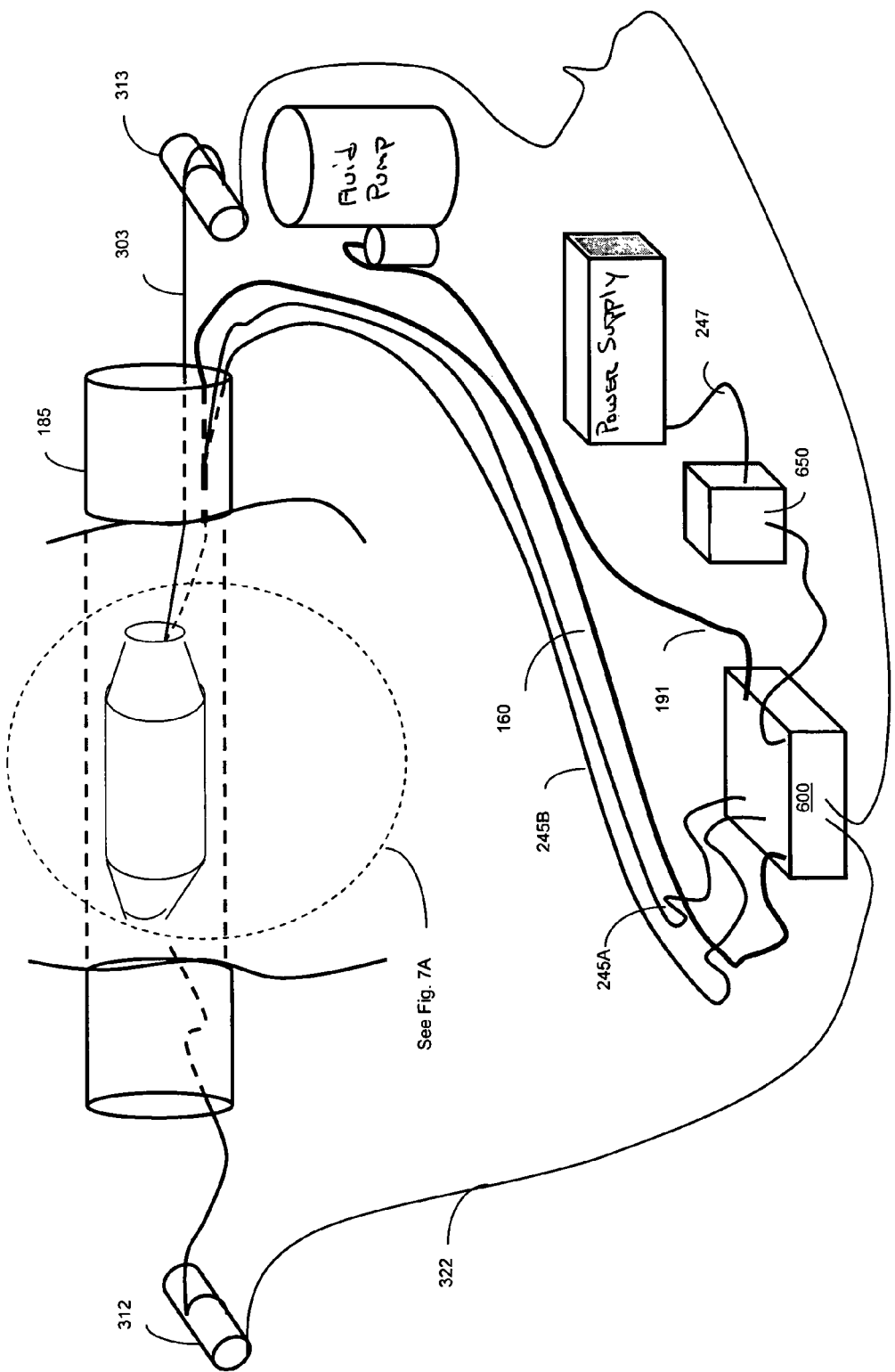
FIG. 7 illustrates the arrangement of the apparatus with the repair device, fluid source and electrical power supply used in one embodiment of the invention.
Figure 7A:
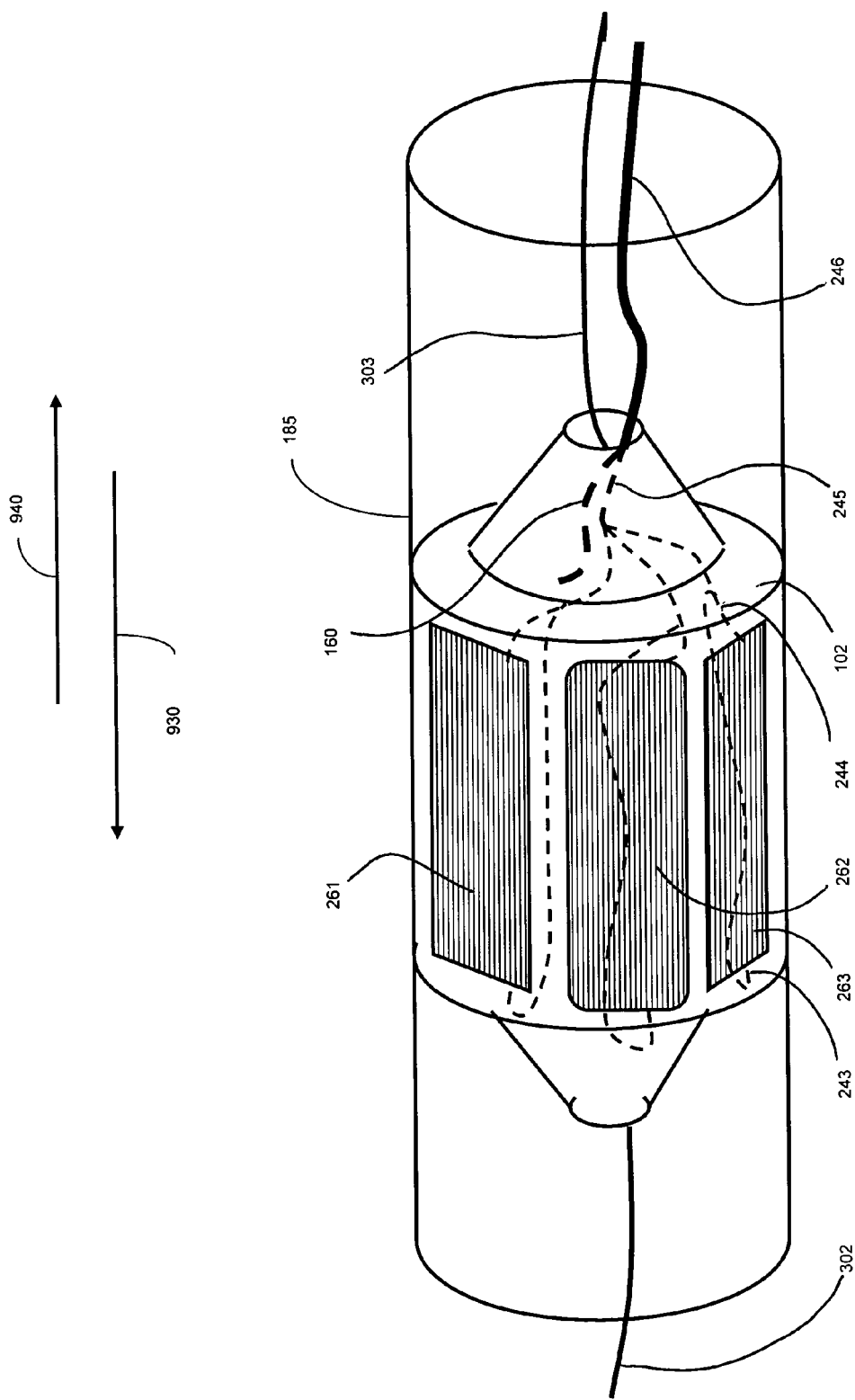
FIG. 7A illustrates a detail of a device within a pipe that is controlled by the invention.

FIG. 7 illustrates a system and the relationship of the controller 600 within the system to the repair device 102, the electrical power supply 270 and the fluid supply source 190. Also illustrated is the electrical power cable 247 between the power supply and the booster 650 and the fluid supply hose 191 between the fluid supply and the controller, as well as the fluid hose 160 from the controller to the repair device. The electric cables 245A, 245B comprising both legs of the electric circuit created in the repair device are also illustrated. FIG. 7 further illustrates the tethers 302, 303 controlling movement of the repair device within the pipe 185, along with winches 312, 313 and the power cables 322, 323 extending from the controller.

FIG. 7A provides a detail of an embodiment of the connective components between the controller (not shown) and the repair device 102. Illustrated is a combined fluid hose 160 and electric cable 245 within a structure 246. Also illustrated are the two tethers 302, 303 at each end of the repair device, multiple heating components or zones 261, 262, 263 and connective wires 243, 244. Movement of the repair device within the pipe 185 is illustrated by the vector arrows 930, 940.

The method and system of the invention teaches using the controller with one or more repair devices that can convey repair material through the pipe to the repair location. These devices may also press the repair material to the inner pipe wall surface. Often the repair material is then heated. The heat is used to cure or mold the repair material to the pipe surface. These devices may include but are not limited to a bladder deployment canister, lateral interface devices, spot repair devices, as well as associated fluid compression or pumping/hydraulic components, hoses, electric cables and power supplies and fluid inflatable or electrically heatable bladder components. Examples of these devices or tools are described fully in pending application Ser. Nos. 10/182,889; 10/256,294; 10/174,188; and 11/313,170 which are incorporated by reference herein.

Figure 8:
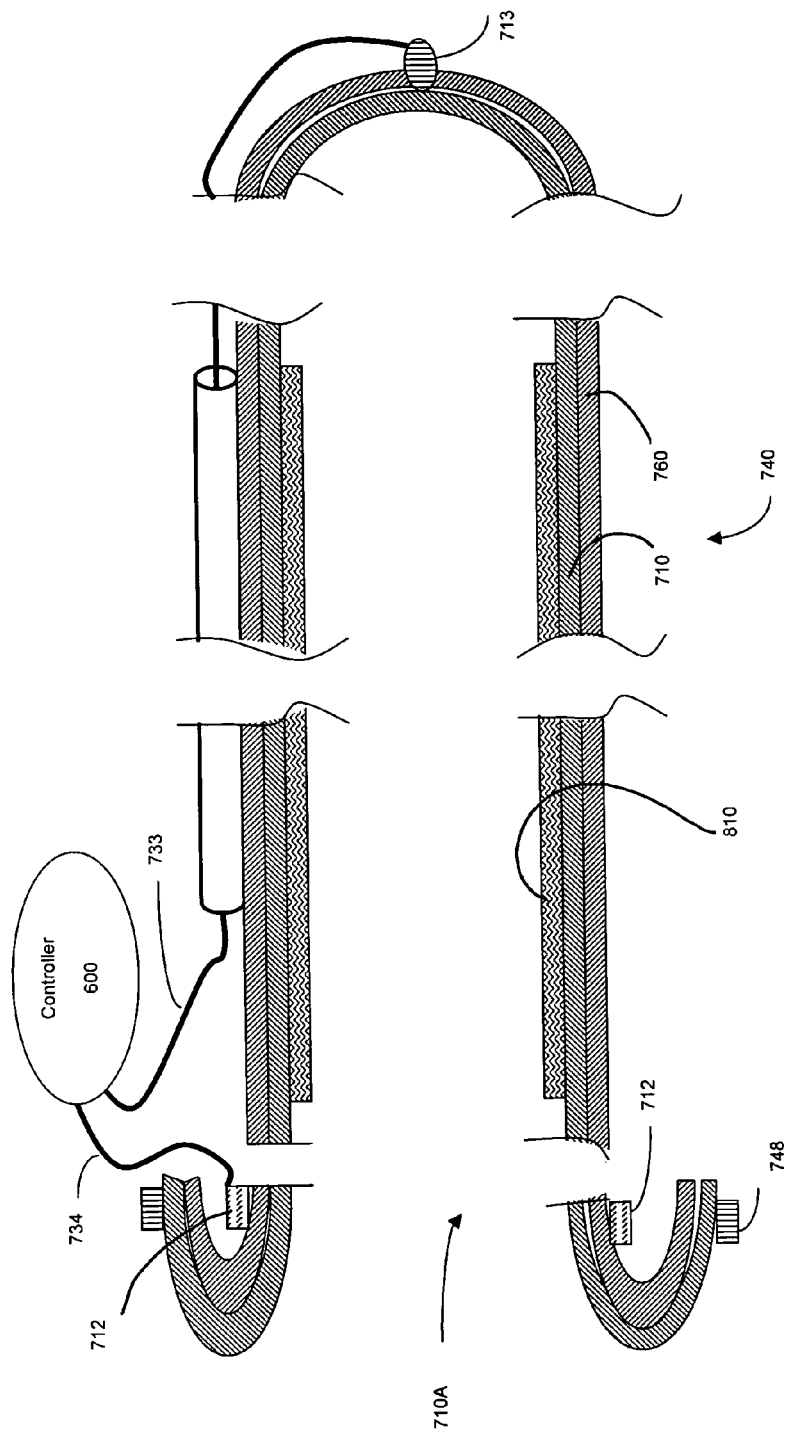
FIG. 8 illustrates the bladder device component and repair material used with the deployment canister and the invention.

In one embodiment of the method taught by the invention, the control device is used in conjunction with a bladder deployment canister, a power supply and air compressor. FIG. 8 illustrates the electrical relationship between the bladder device component of the deployment canister (a repair device) and the controller 600. Illustrated is the electrical contact 712 of the canister housing (not shown) proximate to the open end 710A of the inverted bladder 740. (The open end of the bladder is attached to the bladder deployment port 710 of the canister as shown in FIG. 8B.) The inflatable and heatable bladder comprises a heating component 760 and an inflation component 710. The repair material is also illustrated 810. It will be appreciated that the repair material will be on the outside surface of the everted bladder. Also illustrated is the electrically connective subcomponent 713 at the closed end of the bladder and electrical wires 733, 734 forming the two legs of the electrical circuit with the heating component and the controller.

Figure 8A:
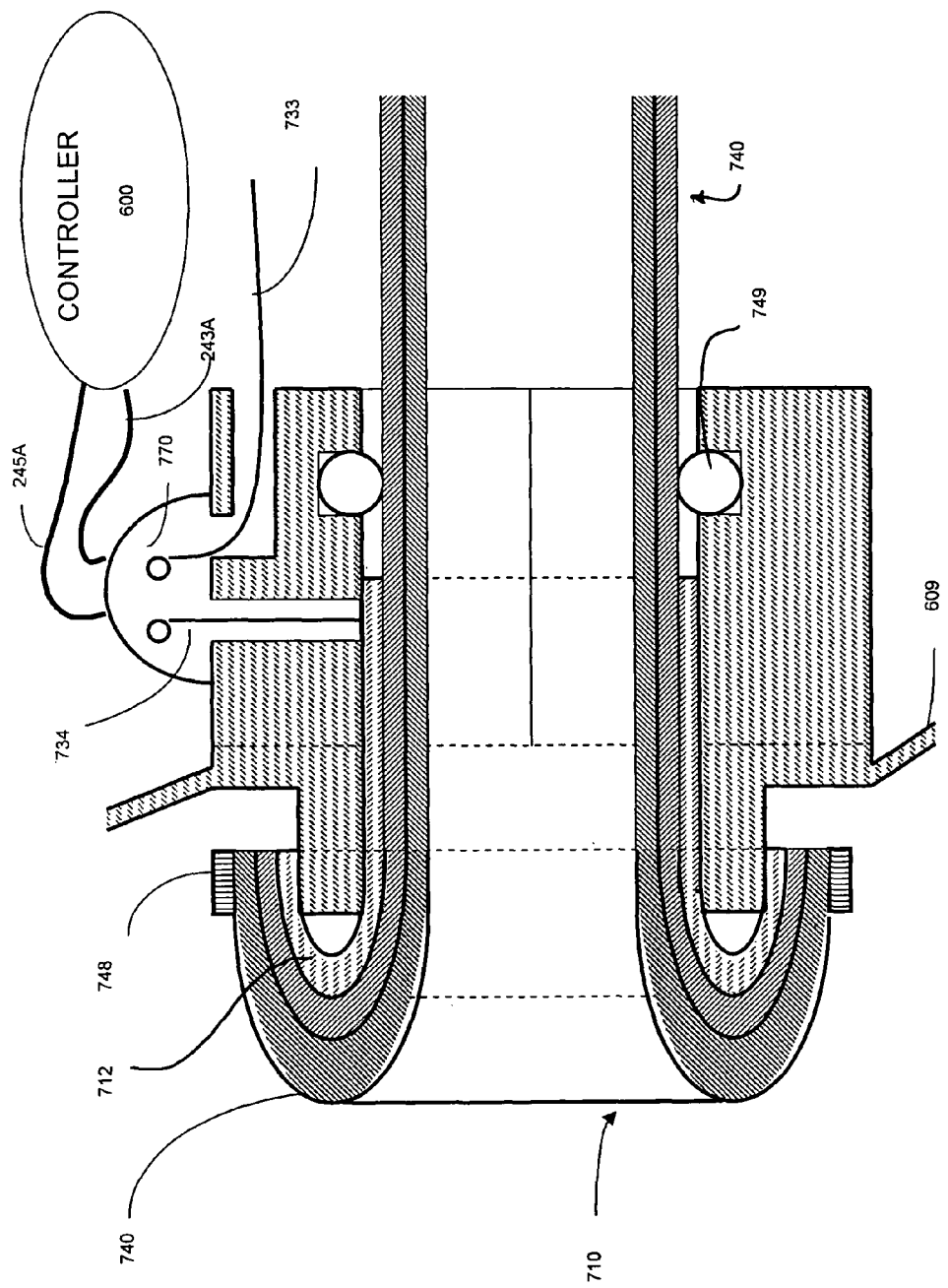
FIG. 8A illustrates a detail of the attachment of the open bladder end to the canister.

FIG. 8A illustrates a detail of the attachment of the open bladder end to the canister. The relationship of the bladder 740 and electrically conductive components of the canister 712, 733, 734, 770 with the controller 600 are again illustrated. Electrical cables 245A, 245B from the controller are in electrical communication with the electrical wires 733, 734 through the connective component 770. Also illustrated is a circular clamp device 748 holding the open end of the bladder to the bladder deployment port 710. The wall of the canister 609 and an o-ring 749 forming part of the fluid sealable connection between the open bladder end and the canister are also illustrated.

FIG. 8B illustrates a cross sectional view of an embodiment of the canister 700 and rotatable spool 760 used to convey and deploy the bladder through the bladder access port 710.

Figure 8C:
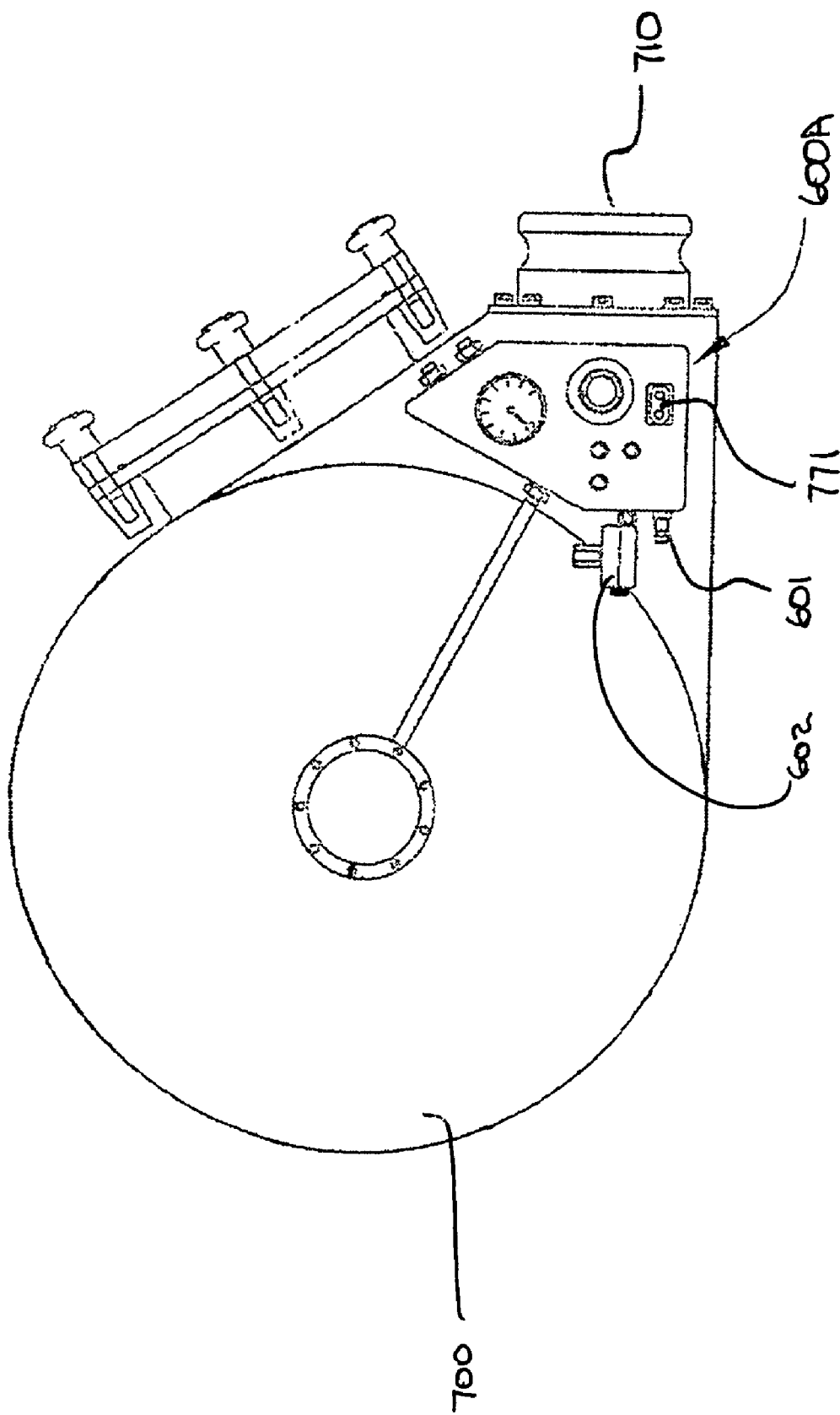
FIG. 8C illustrates a prior art canister repair device showing control components placed on the canister housing.

FIG. 8C illustrates a prior art view of the canister repair device showing a controller mechanism 600A placed on the canister housing. Illustrated are the fluid connecting components 601, 602 and an electrical connective component 771. The bladder deployment canister may be positioned proximate to the pipe access port. It will be appreciated that the controller of the invention permits the operator to control the repair function at a location remote from the pipe access.

The bladder deployment canister may provide storage, transportation and deployment of a flexible, heatable and inflatable bladder or repair material. The bladder component may comprise a fluid inflatable bladder having a cylindrical shape that is closed at one end and an open or closeable second end. The bladder has an interior wall surface and an exterior wall surface. The bladder incorporates electrically conductive material that, when energized with electric current controlled via the controller, can create impedance or resisitive heat (hereinafter "resistive heating") and a sub-component to attach an elongated tether sub-component on the inside bladder wall proximate to the closed bladder end. The tether sub-component has a first end and a second end. The second open end of the bladder can be sealably attached to an opening on the canister component. (See FIGS. 8 through 8B.) Some or all of these components may also be integral to the installed repair materials. For example, the repair material may contain the heating, inflation or temperature monitoring elements, all of which are left in place after completion of the repair.

The canister component, like the bladder, may be fluid sealable. The canister is not expandable and maintains a rigid or fixed volume. The interior of the canister (hereinafter "annulus") can be placed in fluid communication (via the controller) with an external fluid pressure or fluid vacuum source. The canister annulus contains a rotatable spool sub-component in communication with a rotating control mechanism. (See FIGS. 6 and 8B.) The spool also has a mechanism to attach the second tether end. Operation of the spool and tether can be controlled by the controller. The canister also contains an opening ("bladder deployment port") dimensioned to allow the bladder to pass through to be spooled on the spool or deployed out of the canister with fluid pressure. The bladder can be pulled into the canister and spooled on the internal spool and first spooling a portion of the tether (not shown), the closed end of the bladder being inverted into the remainder of the bladder by the pulling action of the spooling tether. In this manner, the flexible bladder operates like a sock being turned inside out. The canister opening also contains mechanisms for sealably attaching the second open end of the bladder. It will be appreciated that the bladder and canister are to be in fluid sealed communication. The canister also contains an electrical power sub-component to convey electrical current from a power source to the electrically conductive material of the bladder.

In utilizing the controller, the operator can activate the air compressor to pump air into the canister repair device, causing the bladder to extend and evert out from the canister. The operator may control the rate of inflation to achieve proper bladder deployment. The operator, using the controller, may also release the winding mechanism controlling the deployment/retraction tether. It will be appreciated that the winding component may be used when the deflated bladder is retracted into the deployment canister.

In one embodiment, when the operator has extended the bladder out of a canister, repair material can be placed on the exterior bladder surface. See FIG. 6, Steps 1 & 2.) The length of the bladder deployed can be controlled via the controller utilizing a gauge and the fluid regulator component.

The repair material can be flexible fibrous material containing heat reactive resin or polymer, either thermal setting or thermal plastic (hereinafter "resin"). The resin can be applied after the material is placed on the bladder or the repair material can be pre-impregnated.

Adjusting the motor controller (see FIG. 5A), the operator may retract the bladder, now containing the repair material, into the canister. FIG. 6, Step 3. The operator may decrease the fluid pressure or completely deflate the bladder. This may be accomplished by adjusting the fluid pressure controller that may, in turn, activate a pressure release valve or a vacuum pump in communication with the bladder and canister. In one embodiment, the tool retraction step may incorporate use of a tether (not shown) attached to the inside of the bladder and proximate to the closed end. The invention can control the winding mechanism(s) that may be attached to the tether, thereby allowing the operator to control the retraction of the bladder and repair material into the canister. It will be appreciated that the bladder can carry the repair material to the selected location within the pipe.

The controller can be utilized in multiple ways. The operational procedures as depicted in FIG. 6, Steps 1 through 7 can be summarized as follows:

Step 1. Unroll or festoon pre-impregnated repair material in preparation for loading into Canister. A staging area equal to the length of the repair is needed. This "loading" procedure can be performed off-site. Stable resin matrix allows up to 8 hours of "out-time" in cool conditions.

Step 2. Attach electrical power supply and hook-up air supply to controller and canister and set the fluid pressure controls to create a positive pressure within the canister. By increasing the fluid pressure and placing the motor controller in "neutral" or "forward", the inflation heating bladder is everted from the canister through the bladder access port and into the repair material. The motor controller controls the spool within the canister. The motor controller therefore can be used to control speed and length of the bladder everted from the canister.

The operator can, from a safe location, increase the fluid pressure to deploy or inflate the bladder or repair material. The fluid pressure is increased within the fixed volume of the canister. The increasing pressure will force the inverted bladder proximate to the inversion hose end to push outward to create a larger volume within the combined and fluid sealed canister and bladder. Stated another way, the operator increases the internal volume of the closed canister bladder system by increasing the fluid pressure. This expansion can be facilitated by the controlled release of the tether attached to the bladder and windable spool. This will loosen the collapsed bladder and tether spooled around the spindle.

Step 3. With bladder fully extended through the length of repair material, set the motor controls to "reverse" and adjust the fluid pressure controller to an "exhaust" setting or otherwise to a negative pressure. This adjustment may automatically open a pressure relief valve. In another embodiment, the exhaust setting may activate a vacuum pump. In another embodiment, the end of the repair material may be tucked into the reverting (inverting) face of the bladder, and is pulled into the bladder as it is spooled back into the canister. The motor controller may also control the rewinding of the tether and inverted bladder onto the spool. The motor controller will be placed in "reverse".

Step 5. Position the bladder access port (or alternatively the end of an inversion hose attached to the bladder access port) at the pipe access port. Attach the electrical power supply and the fluid supply as in Step 2.

The loading procedures (Step 2) may determine where the repair material will actually begin to unfurl. In other words, the location of loading the repair material on the deployed bladder in Step 2 above may be varied. This can be especially useful when inserting through clean-outs, tee's and wye's. In one embodiment, the controller may include a footage counter (component to measure the length of the bladder deployed from the canister). A consumable, temperature sensor (in communication with the controller) can also be inserted into the host pipe to provide feedback to the power controls (not shown).

Step 5. Set the fluid pressure controls to create a positive pressure in the canister sufficient to commence eversion. Eversion speed may be controlled via adjustment of fluid pressure and turning of the spool. In one embodiment, the motor controls (positioned in "forward") may contain a variable speed component. The operator, utilizing the controller, continues to maintain a pressure level by addition of additional fluid volume in response to the everting bladder.

Step 6 illustrates a continuation of this process, with the repair material now on the outside surface of the bladder, extending into the pipe. When the bladder and repair material are deployed to a desired distance within the pipe, the operator can stop the addition of additional fluid and stop the release of additional lengths of tether, thereby holding the inflated bladder at a stationary position within the pipe. A footage counter located on the controller can indicate complete deployment of material on the everting bladder.

The fluid pressure can be further increased to the deployed segment of bladder inflate the bladder in a radial direction, thereby pressing the bladder wall, with the repair material, to the inside pipe wall surface.

In one embodiment, the controller may incorporate a CPU or process controller. A display monitor and data recorder can also be employed. In such an embodiment, the temperature sensor located proximate to the repair material is connected to the controller and a programmable electronic controller may implement the cure of the repair material. Complete cure is indicated on the controller. It will be appreciated that the controller (and operator) may be positioned away from the pipe access port.

In the described and illustrated embodiment the operator may energize the electrically conductive material (not shown) within the bladder with electric current. This can be accomplished using the power controller. This will create the resisitive heat that can cure the heat responsive resin. The operator can control the rate of heat increase and the amount of heat generated by utilizing the potentiometer or power controller to regulate the amount of electrical current.

The controller may monitor the temperature of the bladder or repair material by various methods, including but not limited to thermocouples within selected location on the bladder or by one or more consumable thermocouples placed in the repair material and in detachable communication with the control device. Utilizing the controls, the temperature can be maintained for a selected time to allow cure of a thermosetting resin within the repair material or molding of thermoplastic resin impregnated repair material to the interior of the pipe. The operator can adjust the current to also control the rate of cool down. Upon completion of this cure process or molding step, the power controller may be adjusted to zero or "off" and the operator may commence the repair device removal steps.

Step 7. With cure complete, set fluid controller to a decreased pressure setting at least sufficient to reduce the bladder diameter or to collapse the bladder. The spool can be controllably rotated to rewind the tether and bladder, re-inverting the heating inflation bladder back into canister. This can be accomplished by setting the motor controller to "reverse". Step 7 illustrates the removal of the repair bladder device from the pipe. The removal step is the same as illustrated in FIG. 6, Step 3, but the pipe repair material, now cured, remains in a rigid or fixed position pressed against the inner pipe wall surface.

Figure 9:
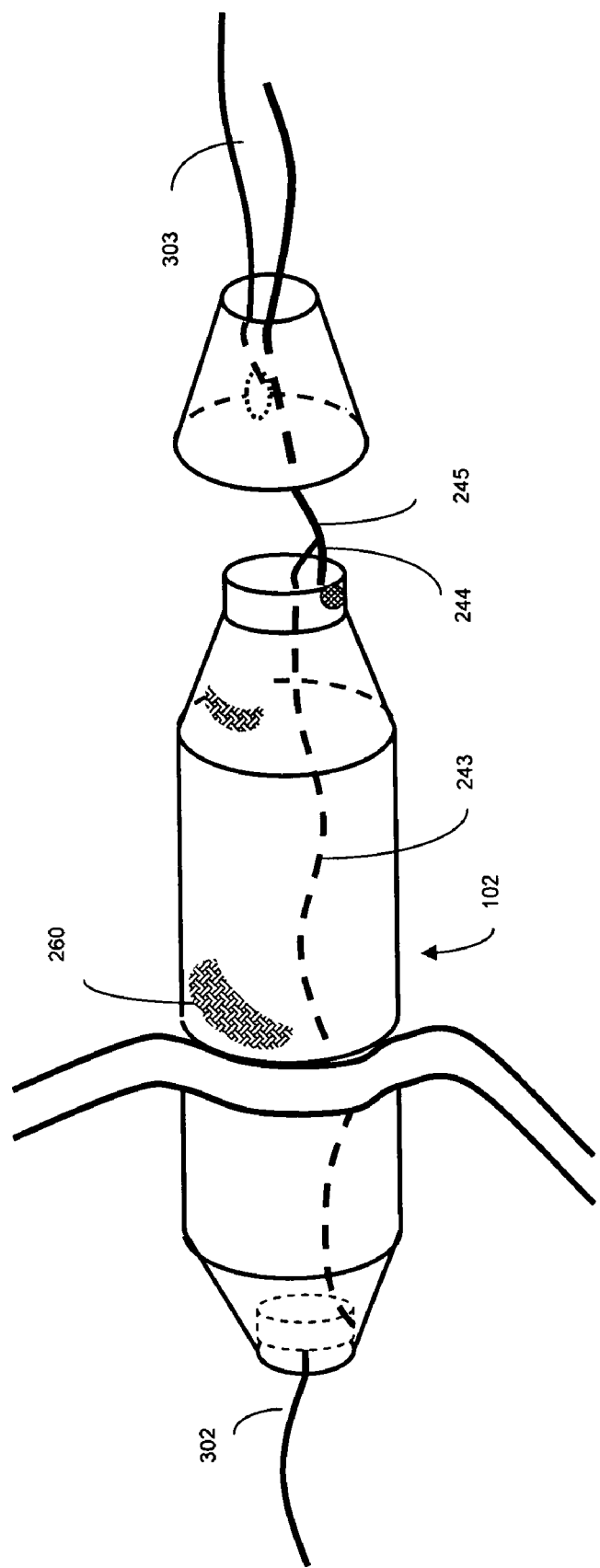
FIG. 9 illustrates a perspective view of a spot repair device used in conjunction with the invention.
Figure 9A:
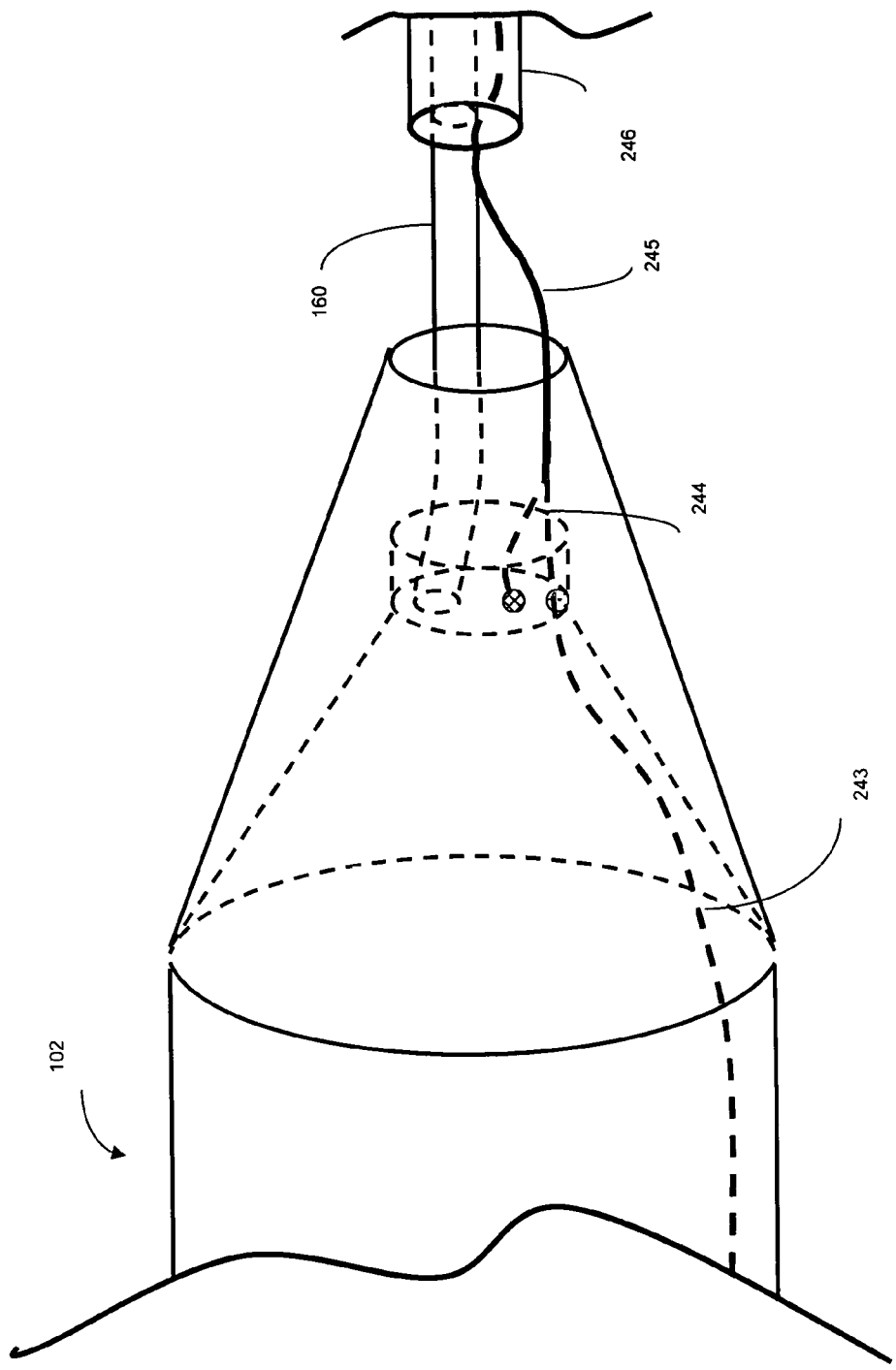
FIG. 9A is a detailed illustrated of one end of the spot repair device and the connecting components to the controller.

Other in situ pipe repair devices that are controlled by the invention may not utilize a bladder deployed from a fluid sealed canister. Such a device is the spot repair bladder illustrated in FIGS. 9 and 9A. FIG. 9 illustrates a perspective view of a spot repair device 102 used in conjunction with the invention. Included in the illustration are the tethers 302, 303, the connective wires 243, 244 in communication with the heating element 260 disposed within the bladder and combined into the electrical cable 245 connected to the controller (not shown). FIG. 9A is a detailed illustration of one end of the spot repair device and the connecting components to the controller. Included in the illustration are the fluid conveying hose 160 and the electrical cable 245 combined into a single subcomponent 246 communicating with the controller. The electrical wires 243, 244 communicating with the heating component and combined into the electrical cable 245 are also illustrated.

FIGS. 10A through 10E illustrate the steps of a repair process utilizing the spot repair device controlled by the controller of the invention. With reference to FIGS. 10A through 10E, this device 102 containing the repair material 550 may be deployed into the pipe 185 by a tether 302 controlled by the controller (not shown). The device may be pulled within the pipe to the repair location by a winch or similar device. The winding motion of the winch is controlled by a first motor controller. The direction of movement is illustrated by vector arrow 930. When the operator has positioned the bladder proximate to the repair location 549, FIG. 10B, the operator can then utilize the fluid pressure control components of the controller to inflate the bladder, FIG. 10C, to press the repair material to the inner pipe wall surface. This step can be accomplished by adjusting the fluid pressure to a positive setting.

After adequate inflation is achieved (the operator being able to monitor the fluid pressure using the fluid pressure gauge), the operator is able to energize the heating component using the power controller. The amount of heat can be monitored and controlled by the operator utilizing the potentiometer or power controller in conjunction with thermocouples or the SCR device and impedance measurements. The duration of the heating can be measured by the timer contained within the invention. In other embodiments, the controller may incorporate a programmable CPU or process controller to control the amount and duration of heat and fluid pressure. A display monitor and data recorder can also be employed. After the operator has determined that the repair material has adequately been heated, for example, to affect a desired cure of a thermosetting resin matrix of the repair material, the electrical power can be reduced or turned off.

Figure 10E:
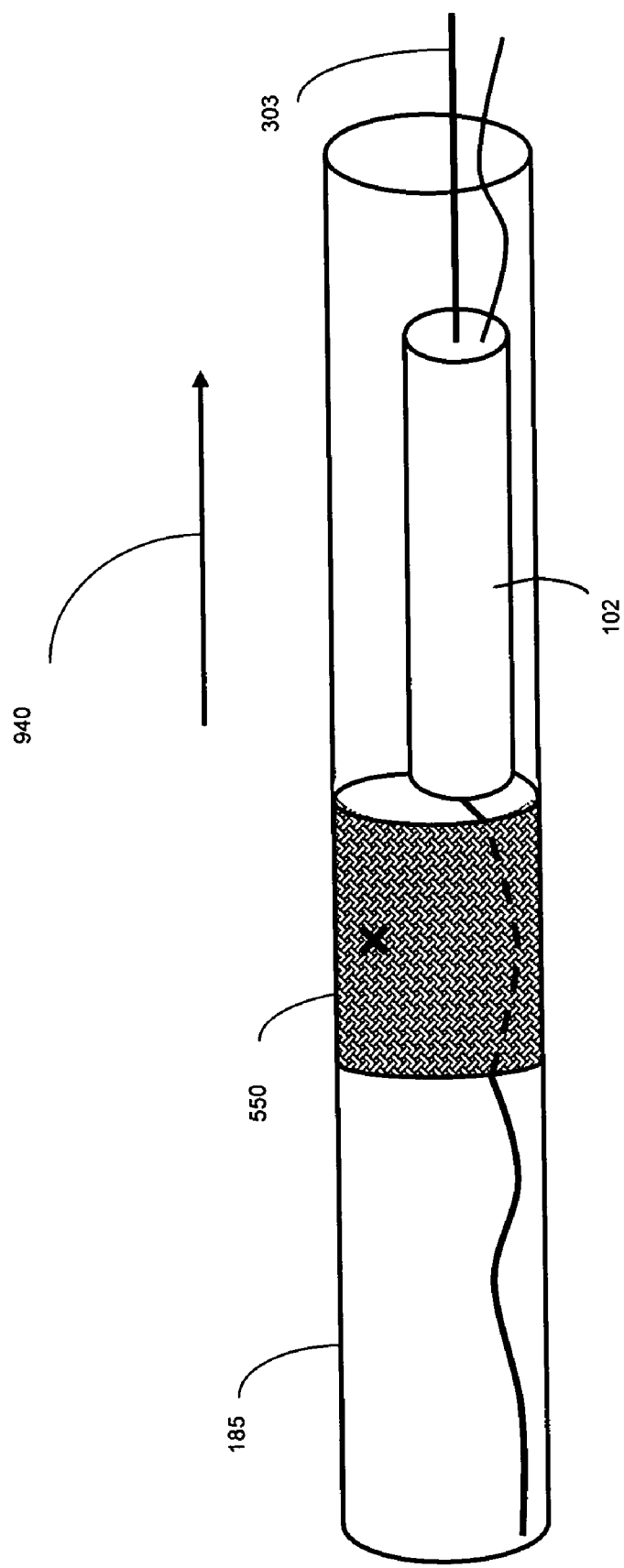

One step of the retraction process of the tool from the pipe is the reduction of pressure within the bladder. This step can be facilitated by creating a negative pressure by use of a vacuum pump controlled by the controller. The deflation of the bladder is important to the separation of the repair material from the outer surface of the bladder. After the operator has sufficiently deflated the bladder, FIG. 10D, the operator may then activate a second winding motor attached to a tether 303 connected to the bladder, thereby pulling the deflated bladder from the pipe. The retraction is shown in FIG. 10E by vector arrow 940.

In another embodiment, the controller may be used in the repair of the interface or connection of two pipes. The may be accomplished utilizing the Lateral Interface Device (a repair device) described in application Ser. No. 10/182,889.

While specific embodiments have been illustrated and described, numerous modifications are possible without departing from the spirit of the invention, and the scope of protection is only limited by the scope of the accompanying claims.

What is claimed is:

1. A pipe repair device controller comprising a fluid control component, an electrical power control component and a motor control component wherein the controller controls fluid pressure and electrical power to an inflatable and resistively heatable bladder of the repair device and moves the repair device by a winch.

2. A controller attachable to a fluid source, an electrical power source, a motor powered winch, and a repair device wherein the controller comprises a fluid control component, an electrical power control component, and a motor control wherein the fluid control component extends a bladder from the repair device and inflates the bladder to press a repair material to an inside pipe wall the electrical power control heats the inflation bladder of the repair device and moves the repair device by fluid pressure or a motor powered winch.

3. The controller of claim 2 further comprising controls to a winding mechanism.

4. The controller of claim 2 further comprising an SCR.

5. The controller of claim 2 further comprising a fluid input, a fluid output, an electrical input and an electrical output.

6. The controller of claim 2 further comprising a CPU.

* * * * *